United States Patent [19]

Hopkins

[11] 3,717,607

[45] Feb. 20, 1973

[54] STABILIZATION OF POLY(VINYL HALIDE)

[75] Inventor: George C. Hopkins, Clarence, N.Y.

[73] Assignee: Hooker Chemical Corporation, Niagara Falls, N.Y.

[22] Filed: Sept. 21, 1970

[21] Appl. No.: 74,168

[52] U.S. Cl. ....................260/45.7 R, 260/45.95

[51] Int. Cl. ....................C08f 45/62

[58] Field of Search ...260/45.7 R, 45.95; 99/171 CA

[56] References Cited

UNITED STATES PATENTS

| | | | |
|---|---|---|---|
| 2,844,551 | 7/1958 | Orthner et al. | 260/18 |
| 2,861,052 | 11/1958 | Elliott | 260/45.75 |
| 3,178,389 | 4/1965 | Hallenbeck | 260/41.5 |
| 3,398,108 | 8/1968 | Turner | 260/23 |
| 3,406,145 | 10/1968 | Hennes | 260/45.75 |
| 3,442,853 | 5/1969 | Gobstein | 260/45.95 |
| 3,446,765 | 5/1969 | Pryer | 260/23 |
| 3,151,103 | 9/1964 | Heckmaier et al. | 260/92.8 |
| 3,054,771 | 9/1962 | Hiestand et al | 260/23 |
| 3,226,351 | 12/1965 | Werber et al | 260/29.6 |
| 3,084,135 | 4/1963 | Scullin | 260/41 |
| 3,318,841 | 5/1967 | Tomlinson et al. | 260/45.75 |
| 2,387,571 | 10/1945 | Fikentscher et al. | 260/45.7 |
| 2,918,451 | 12/1959 | Elliott | 260/45.75 |
| 3,558,539 | 1/1971 | Irish, Jr. | 260/23 |

*Primary Examiner*—Donald E. Czaja
*Assistant Examiner*—R. A. White
*Attorney*—Peter F. Casella, Donald C. Studley, Richard P. Mueller and James F. Mudd

[57] ABSTRACT

This invention relates to a vinyl halide resin which has been heat stabilized by incorporating therein an aluminum compound of the formula:

$$Al(R)_{3-n}X_n$$

wherein R is R' or OR'' and R' is alkyl, aryl, arylalkyl, alkylaryl, and mixtures thereof; R'' is hydrogen, alkyl, aryl, arylalkyl, alkylaryl, and mixtures thereof; and *n* is an integer from 0 to 1 and X is selected from the group consisting of chlorine, bromine, fluorine, iodine and mixtures thereof. The aluminum compound is used to the extent of about 0.002 to 5 percent by weight of resin.

7 Claims, No Drawings

STABILIZATION OF POLY(VINYL HALIDE)

BACKGROUND OF THE INVENTION

1. Field of the Invention

The present invention relates to heat stabilized vinyl halide resin compositions and to a process for their production. The invention is directed to the use of new and improved stabilizing materials showing definite advantage in increasing the resistance of vinyl halide resins to discoloration under the effects of heat.

As employed herein, the term "vinyl halide resin" is meant to include those resins prepared by the polymerization of a vinyl halide either alone or in conjunction with a minor proportion of other unsaturated polymerizable compounds such as vinylidene chloride, acrylonitrile, styrene, vinyl esters of aliphatic acids such as vinyl acetate, alkyl esters of monoolefinic acids such as diethyl fumerate or maleate and the like, and in addition, vinylidene chloride polymer.

The vinyl halide is most preferably the chloride although the other halides such as the bromide, fluoride and mixtures thereof are also contemplated. The invention is especially applicable to vinyl halide resins prepared by polymerization of vinyl chloride or vinylidene chloride either alone or in conjunction with a minor proportion of acrylonitrile or vinyl acetate.

2. Description of the Prior Art

Vinyl halide resins have valuable properties as components of thermoplastic compositions of various types as is well-known in the art. It is also well-known that vinyl halide resins are sensitive to the effects of both heat and light as manifested by their discoloration upon exposure. In the compounding and processing of these resins into molded and extruded articles such as in the manufacture of dolls or synthetic fibers or alternately as constituents of coating compositions, it is usually necessary to subject the resins to elevated temperatures of up to about 200° C. to allow the resins to flow. Under these conditions, the resins tend to progressively discolor or darken. A gradual development of color in the resins can also generally be observed upon exposure to light or to such elevated temperatures as may be experienced in normal usage.

While initial stages of color development reached during the formation of subsequent treatment of the resin may not greatly detract from some of their qualities for many uses, the continued color development in the resins becomes increasingly undesirable. Small amounts of stabilizing materials are therefore incorporated into vinyl halide resins for the purpose of retarding or inhibiting discoloration.

Prominent among the considerable number of compounds designed to function as stabilizers for vinyl halide compositions are the organometallic compounds, particularly those containing tin or lead such as dibutyltin maleate and lead stearate. Unfortunately, these stabilizer compounds cannot be used where the resin compositions must be relatively nontoxic. In addition, many effective stabilizer compositions are high in cost or must be used at relatively high levels to obtain a satisfactory degree of stabilization of the resin.

SUMMARY OF THE INVENTION

According to the present invention, it has now been found that vinyl halide resins can be stabilized using small amounts of an aluminum compound so as to provide a resin composition having increased stability to the effects of heat, at elevated processing temperatures, under normal room temperature, or outdoor aging conditions. The invention also provides for a process in which the stabilizer is incorporated into the vinyl halide resin so as to render it stable to the effects of heat thus avoiding the discoloration normally characteristic of unstabilized vinyl halide resin. The aluminum compounds of the invention have the general formula:

$$Al(R)_{3-n}X_n$$

wherein R is R′ or OR″ and R′ is a member of the group consisting of monovalent alkyl having two to 16 carbon atoms, monovalent aryl having six to 18 carbon atoms, monovalent alkylaryl and aralkyl having seven to 20 carbon atoms or mixtures thereof; R″ is a member of the group consisting of hydrogen, alkyl having two to 16 carbon atoms, aryl containing six to 18 carbon atoms, aralkyl and alkylaryl having seven to 20 carbon atoms or mixtures thereof; *n* is an integer from 0 to 1, and X is selected from the group consisting of chlorine, bromine, fluorine, iodine and mixtures thereof.

The aluminum compound is advantageously incorporated into the vinyl halide resin by processes such as by slurrying the resin in an organic solvent in which the aluminum compound has been previously dispersed, or is subsequently dispersed, dry blending the vinyl halide resin in a powdered form with the aluminum compound, milling the vinyl halide resin together with the aluminum compound and the like.

The stabilized vinyl halide resins of this invention are particularly desirable where it is necessary to have clear films of the resin, where the resin must be used in so-called nontoxic applications, and where the cost of stabilization is required to be low. The process of imparting the stabilizing composition is adapted to be accomplished together with other normal techniques for handling the polyvinyl halide resin such as the incorporation of plasticizers. The stabilizer may even be added by dry blending, thus allowing the stabilizer to be easily incorporated at the point of manufacture of the vinyl halide resin composition.

The effectiveness of this method of stabilization is unexpected in that as little as 20 parts per million aluminum compound will produce a remarkable reduction in the normal formation of color in a polyvinyl halide composition upon exposure to temperature such as 200° C. A film pressed at this temperature using 6,000 psi. for 2 minutes was crystal clear and nearly colorless whereas a similarly pressed film of unstabilized polyvinyl chloride was a deep red-orange color. In addition, it is surprising that the aluminum compounds of the present invention afford any stabilization since such compounds as aluminum chloride are known to decompose the polymer when such a mixture is heated at elevated temperatures.

DETAILED DESCRIPTION OF THE INVENTION

The preparation of polyvinyl halide compositions stabilized by the addition of an aluminum compound is accomplished by the addition of ingredients to obtain a simple mixture of the aluminum compound with the dry resin, or by the incorporation of the aluminum compound into the resin previously heated by milling, or by the incorporation by slurrying the polyvinyl halide in liquid diluents in which the aluminum compound is present. In the milling process it has been found that the resin is capable of dispersing the aluminum compound at temperatures of 110° – 200° C. throughout the milled sheet of resin.

For ease of handling, the additive can also be added to the milled polymer in solution in a hydrocarbon carrier. Any hydrocarbon solvent, for instance, benzene, which is volatilized at the blending temperature is operable. Choice of such solvents would be obvious to one skilled in the art.

Alternatively, in order to carry out the invention, it is possible to mix the stabilizer with a plasticizer ordinarily used with the poly(vinyl halide) resin. This mixture is then dry blended with the poly(vinyl halide) resin and the composition is then subjected to milling at temperatures, for instance, between 110° to 200° C. (preferably at about 125° centigrade) incorporating at the same time any other modifying agents such as pigments, fillers etc.

In using the process of slurrying in diluents as a means of blending the stabilizer with the resin, it has been found that diluents which are incapable of dissolving the poly(vinyl halide) resin or the aluminum compound are still useful in providing a medium in which the finely divided particles of the aluminum compound may uniformly contact the finely ground particles of the poly(vinyl halide) resin. Since the fineness of grind of poly(vinyl halide) compositions varies considerably from grade to grade and from manufacturer to manufacturer, it has been found desirable to use grades having the greatest surface area per unit of weight to provide the greatest uniformity of stabilization when using the method of incorporating the aluminum compound by slurrying in diluents. Suitable diluents include alcohols of 1–10 carbon atoms, such as methanol, ethanol, carbon tetrachloride and perchloroethylene; and aliphatic hydrocarbons, such as V.M.&P. naptha, and the like.

The organic portion of the aluminum compound of the invention may contain alkyl, aryl, arylalkyl and alkylaryl groups. The alkyl portion may be straight or branched chain and usually contains from one to about 18 carbon atoms and preferably about one to 6 carbon atoms. Illustrative examples of alkyl groups are: methyl, ethyl, propyl, isopropyl, butyl, isobutyl, amyl, hexyl, cyclohexyl, heptyl, octyl, nonyl, dodecyl, pentadecyl, stearyl, octadecyl, and the like, said alkyl group being a monovalent radical derivable from an aliphatic hydrocarbon by the removal of one hydrogen atom. A typical example of a heterocyclic group which may comprise the organic portion of the aluminum compound of the invention is the furfuryl group.

Typical aryl substituents, including aralkyl and alkaryl groups, which usually contain from six to about 10 carbon atoms, are phenyl, benzyl, tolyl, phenylethyl, xylyl, naphthyl, hexylphenyl, and the like, said aryl group being a monovalent radical derivable from an aromatic hydrocarbon by the removal of one hydrogen atom. The aryl radicals can be substituted by halogen, such as chlorine, bromine, and fluorine, as in p-chlorophenyl, p-bromophenyl, p-fluorophenyl, and the like.

Aluminum containing additives include but are not limited to aluminum hydroxide, triethyl aluminum, trioctyl aluminum, diethyl aluminum chloride, aluminum trimethoxide, aluminum triethoxide, aluminum triisopropoxide, aluminum triisobutoxide, aluminum trisecbutoxide, aluminum triisobutoxide, aluminum tridecoxide, aluminum tridodecoxide, aluminum trihexadecoxide, diisopropoxy aluminum chloride, diethoxy aluminum chloride, triphenyl aluminum, triphenoxy aluminum, tris(p-tolyl) aluminum, tris(tolyloxy) aluminum, tris(2,6-dimethyl-phenoxy) aluminum, tris(2,6-diphenylphenoxy) aluminum, tris(2,6-diisopropylphenoxy) aluminum, tris(2,6-ditertiary butylphenoxy) aluminum, tris(2-methyl-6-tertiary butyl phenoxy) aluminum, tribenzyl aluminum, tribenzyloxy aluminum, tris(paramethyl benzyl) aluminum, tris(paramethyl benzyloxy) aluminum and the like.

Among the plasticizers which can be incorporated in the poly(vinyl halide) resins are dioctylphthalate, dibenzylsebacate, tricresylphosphate, dibutylphthalate, di-(2-ethylhexyl) phthalate, di-(2-ethylhexyltetrachlorophthalate) and the like. The amount of plasticizer used can vary on a weight basis from about 20 percent to about 80 percent based on the total weight of the poly(vinyl halide) resin.

Among the fillers that can be employed are, for instance, carbon black, silica, baryties, zinc oxide, clay, wood flour and other pigments or fillers commonly used in the rubber and plastics industries. The amount of fillers can be varied widely and generally is within the range of about 5 to 200 percent by weight of the total weight of the filler, plasticizer, poly(vinyl halide) resin composition and preferably 20–80 percent.

The aluminum compound stabilizer is used in a stabilizing proportion, to the extent of about 0.002 to 5 percent preferably 0.002 to 1 percent based on the weight of resin.

There are several ways of determining the efficiency of stabilizers in a vinyl halide polymer particularly for resistance to the effects of heat. The two principle ways are to follow the changes of color of a film after it is exposed to heat or to detect the presence of free hydrochloric acid which is liberated. The two methods do not necessarily correlate. The following sequence of color change suitably numbered enables the degree of breakdown to be expressed quantitatively: (0) clear, (1) barely detectable change, (2) very slight change, (3) slight yellow tinge, (4) pale yellow, (5) yellow, (6) faint tinge of red, (7) pale red, (8) red, (9) deep red, (10) very deep red/black, and (11) black. For uniform evaluation a series of films of polyvinyl halide degraded to the colors described is best prepared for use as controls. In the examples which follow, weighed portions of poly(vinyl chloride) were dried to constant weight and a film was made by pressing at 6,000 psi., 200° C., 2 minutes in order to obtain differences in color representative of the degree of breakdown or degradation resulting from this exposure to heat.

The utility and advantages of the stabilizers of the invention as well as the resin compositions stabilized therewith will further become apparent from the following examples which are included to illustrate the practice of the invention. Unless indicated otherwise in this specification and claims, temperatures are in degrees centigrade and parts are by weight.

EXAMPLE 1

To a slurry of poly(vinyl chloride) containing 10 grams of the polymer in 50 milliliters of methanol, 0.114 grams of triethyl aluminum was added. After mixing for 20 minutes, the polymer was filtered, washed with methanol and dried to constant weight (9.98 grams) at 50° centigrade in vacuum. A film-pressed under the conditions previously described was crystal clear and nearly colorless corresponding to a rating of 1 on the above color scale. A control sample showed a deep orange-red color corresponding to a rating of 9 on the above scale.

Analysis of the stabilized poly(vinyl chloride) polymer by atomic absorption revealed the presence of 38 parts per million of aluminum. The inherent viscosity of the stabilized polymer was 0.798 (0.5 grams in 100 milliliters of cyclohexanone) as compared to an inherent viscosity of 0.784 for a control sample without stabilizer.

EXAMPLE 2

The procedure of Example 1 was repeated with the exception that 15 milliliters of carbon tetrachloride were substituted for the methanol slurrying media. Essentially the same results were obtained in a heat resistance test as described above with the stabilized poly(vinyl chloride) polymer showing a rate of 1 and the control sample showing a rating of 9 upon pressing at 200° C. 6,000 psi. for 2 minutes.

EXAMPLE 3

To a slurry of poly(vinyl chloride) 10 grams in 15 milliliters of carbon tetrachloride, 0.0032 grams of aluminum isopropoxide were added and the mixture stirred for 15 minutes. After evaporating most of the carbon tetrachloride at room temperature under nitrogen blanket, the product was dried to a constant weight of 10 grams at 50° C. in vacuum. On testing for color stability after exposure to heat by the method described above, a film of the stabilized poly(vinyl chloride) polymer gave a color corresponding to rating number 1.

EXAMPLES 4–7

The same procedure as in Example 2 was followed except that the amounts of various stabilizers were added as shown in the following Table.

| Example Number | Stabilizer | Grams/10 grams of Poly(vinyl chloride) | Heat Resistance Ratings |
|---|---|---|---|
| 4 | trioctyl aluminum | 0.0062 | 1 |
| 5 | diethyl aluminum chloride | 0.120 | 2 |
| 6 | aluminum trimethoxide | 0.0064 | 4 |
| 7 | aluminum tripropoxide | 0.156 | 4 |

EXAMPLE 8

The same procedure as in Example 2 was followed except that a poly(vinyl chloride) copolymer was substituted. The comonomer being vinyl acetate which was present in the copolymer to the extent of 15 percent of the total composition by weight. Results of the heat resistance test as described above showed a rating of 2 for the stabilized polymer with a rating of 10 for the control sample.

EXAMPLE 9

The same procedure as in Example 2 was followed except that the stabilizing additive was aluminum chloride. Results of a heat resistance test show a rating of 11 on the stabilized polymer and a rating of 9 on the unstabilized control sample.

EXAMPLE 10

The same procedure as in Example 2 was followed except that that the composition of the stabilizer consisted of aluminum hydroxide. Heat resistance tests following the procedure as described above showed a rating of 5 on the stabilized polymer with a rating of 9 on the control sample.

Although specific examples of the invention have been set forth hereinabove, it is not intended to limit the invention thereto but to include the variations and modifications of the invention.

What is claimed is:

1. The composition of matter comprising a resin selected from the group consisting of a vinyl chloride homopolymer, a vinylidene chloride homopolymer, vinyl chloride copolymers containing a major proportion of vinyl chloride units and vinylidene chloride copolymers containing a major proportion of vinylidene chloride units, and a stabilizing proportion of an additive or mixture of additives of the formula:

$$Al(R)_{3-n}Cl_n$$

wherein R is a member of the group consisting of monovalent alkyl having two to 16 carbon atoms, monovalent aryl having six to 18 carbon atoms, monovalent alkylaryl and aralkyl having seven to 20 carbon atoms or mixtures thereof and n is an integer from 0 to 1.

2. A composition of matter according to claim 1 comprising said resin and from about 0.002 to about 1 weight percent of said resin of said additive or mixture of said additives.

3. A composition of matter according to claim 1 comprising a poly(vinyl chloride) resin.

4. A composition of matter according to claim 1 wherein said resin is selected from the group consisting of vinylidene chloride copolymers and vinyl chloride copolymers.

5. The composition of claim 1 wherein the additive is triethyl aluminum.

6. The composition of claim 1 wherein the additive is diethyl aluminum chloride.

7. The composition of claim 1 wherein the additive is trioctyl aluminum.

* * * * *